(12) United States Patent
Merget et al.

(10) Patent No.: US 12,722,269 B2
(45) Date of Patent: Sep. 1, 2026

(54) NON-CONTACT SPEED SELECTOR SWITCH IN ROTARY POWER TOOL

(71) Applicant: MILWAUKEE ELECTRIC TOOL CORPORATION, Brookfield, WI (US)

(72) Inventors: Maxwell L. Merget, Whitefish Bay, WI (US); Jingyuan Liang, Toronto (CA); Michael R. Sande, Waukesha, WI (US); Michael Halverson, Greenfield, WI (US); Ian Duncan, Colgate, WI (US); Nicholas C. Mantych, Burlington, WI (US); Alex Huber, Menomonee Falls, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/966,455

(22) Filed: Dec. 3, 2024

(65) Prior Publication Data

US 2025/0091188 A1 Mar. 20, 2025

Related U.S. Application Data

(63) Continuation of application No. 18/460,967, filed on Sep. 5, 2023, now Pat. No. 12,208,501, which is a (Continued)

(51) Int. Cl.
*B25F 5/00* (2006.01)
*B25B 21/00* (2006.01)
(Continued)

(52) U.S. Cl.
CPC .............. *B25F 5/001* (2013.01); *B25B 21/00* (2013.01); *B25D 17/00* (2013.01); *B25F 5/026* (2013.01);
(Continued)

(58) Field of Classification Search
CPC ........... B23B 45/02; B23B 47/06; B23Q 5/10; B24B 23/00; B25F 5/00; B25F 5/001;
(Continued)

(56) References Cited

U.S. PATENT DOCUMENTS 5,136,220 A * 8/1992 Philipp ............. A61B 17/1626 318/362
5,156,221 A 10/1992 Breitenmoser
(Continued)

FOREIGN PATENT DOCUMENTS

CN 201505880 U 6/2010
DE 19510365 A1 3/1996
(Continued)

OTHER PUBLICATIONS

International Search Report and Written Opinion for Application No. PCT/US2018/058628 dated Feb. 20, 2019, 17 pages.

*Primary Examiner* — Jacob A Smith
(74) *Attorney, Agent, or Firm* — Michael Best & Friedrich LLP

(57) ABSTRACT

A power tool includes a housing having a motor housing portion and a handle portion extending therefrom. An electric motor is positioned within the motor housing portion. The power tool also includes trigger switch configured to activate and deactivate the motor. The power tool further includes a non-contact mode selector switch that is separate from the trigger switch and configured to adjust an operational mode of the tool. The non-contact mode selector switch is positioned in a foot of the handle portion opposite the motor housing portion.

9 Claims, 10 Drawing Sheets

Related U.S. Application Data continuation of application No. 16/177,612, filed on Nov. 1, 2018, now Pat. No. 11,897,110.

(60) Provisional application No. 62/612,777, filed on Jan. 2, 2018, provisional application No. 62/582,516, filed on Nov. 7, 2017.

(51) Int. Cl.

*B25D 17/00* (2006.01)
*B25F 5/02* (2006.01)
*H02P 29/40* (2016.01)
*B25B 21/02* (2006.01)
*B25D 16/00* (2006.01)

(52) U.S. Cl.

CPC ............ *H02P 29/40* (2016.02); *B25B 21/026* (2013.01); *B25D 16/003* (2013.01); *B25D 16/006* (2013.01); *B25D 2216/0084* (2013.01); *B25D 2250/095* (2013.01); *B25D 2250/201* (2013.01); *B25D 2250/221* (2013.01); *B25D 2250/255* (2013.01); *B25D 2250/265* (2013.01)

(58) Field of Classification Search

CPC . B25F 5/02; B25F 5/026; B25B 21/00; B25B 21/026; B25D 16/003; B25D 16/006; B25D 17/00; B25D 2216/0084; B25D 2250/095; B25D 2250/201; B25D 2250/221; B25D 2250/255; B25D 2250/265

USPC .................................. 173/47, 110, 216, 217

See application file for complete search history.

(56) References Cited

U.S. PATENT DOCUMENTS 5,365,155 A 11/1994 Zimmermann
6,443,675 B1 9/2002 Kopras et al.
7,359,628 B2 4/2008 Broghammer et al.
8,261,642 B2 9/2012 Brändström et al.
10,414,033 B2 9/2019 Ekstrom et al.
2003/0226673 A1 12/2003 Burger et al.
2009/0173510 A1 7/2009 Milborne et al.
2010/0134055 A1 6/2010 Leong et al.
2010/0163261 A1* 7/2010 Tomayko ............... B25D 16/00 173/217
2012/0074881 A1 3/2012 Pant
2012/0169256 A1 7/2012 Suda et al.
2013/0025899 A1* 1/2013 Kuehne ................ B23B 45/008 173/216
2013/0048325 A1* 2/2013 Kuehne .................. B25F 5/001 173/216
2013/0133911 A1* 5/2013 Ishikawa .............. B25B 21/026 173/176
2013/0186661 A1 7/2013 Okubo et al.
2013/0249463 A1 9/2013 Nishikimi
2013/0269961 A1* 10/2013 Lim ....................... B25F 5/001 173/1
2013/0327552 A1 12/2013 Lovelass et al.
2014/0008090 A1 1/2014 Kokinelis et al.
2014/0015383 A1* 1/2014 Kokinelis .............. H02P 31/00 310/68 A
2014/0028226 A1* 1/2014 Mergener ................. B25F 5/00 318/400.09
2014/0225544 A1 8/2014 Mergener
2014/0262389 A1 9/2014 Simeone et al.
2014/0284070 A1 9/2014 Ng et al.
2015/0041164 A1 2/2015 Sergyeyenko et al.
2015/0174744 A1 6/2015 Scott et al.
2016/0107297 A1 4/2016 Ishikawa et al.
2016/0221085 A1 8/2016 Zhong et al.
2016/0229045 A1 8/2016 Hashimoto et al.
2016/0301340 A1* 10/2016 Najjar .................... B25F 5/001
2016/0342151 A1 11/2016 Dey, IV et al.
2016/0354888 A1 12/2016 Huber et al.
2017/0109488 A1 4/2017 Still et al.
2017/0190032 A1* 7/2017 Leong ................ B25B 23/1475
2017/0234484 A1 8/2017 Vanko et al.
2017/0246735 A1 8/2017 Hashimoto et al.
2017/0246736 A1 8/2017 Kikuchi
2017/0282344 A1 10/2017 Yin
2017/0294819 A1 10/2017 Crosby et al.
2018/0111259 A1 4/2018 Takeda et al.
2019/0039227 A1 2/2019 Takeda et al.

FOREIGN PATENT DOCUMENTS

EP 1081725 A2 3/2001
WO 2017021144 A1 2/2017

* cited by examiner

NON-CONTACT SPEED SELECTOR SWITCH IN ROTARY POWER TOOL

CROSS-REFERENCE TO RELATED APPLICATIONS

This application is a continuation of U.S. patent application Ser. No. 18/460,967 filed on Sep. 5, 2023, now U.S. Pat. No. 12,208,501, which is a continuation of U.S. patent application Ser. No. 16/177,612 filed on Nov. 1, 2018, now U.S. Pat. No. 11,897,110, which claims priority to U.S. Provisional Patent Application No. 62/582,516 filed on Nov. 7, 2017 and U.S. Provisional Patent Application No. 62/612,777 filed on Jan. 2, 2018, the entire contents of each of which are incorporated by reference herein.

FIELD OF THE INVENTION

The present invention relates to rotary power tools, and more specifically to switches for adjusting a rotational speed of the rotary power tool.

BACKGROUND OF THE INVENTION

There are various power tools known in the art that include a switch for adjusting a speed of the motor. These switches may include electrical conductors that selectively electrically connect for closing a circuit and providing an electrical signal to a controller in the power tool, which is then used to change the rotational speed of the motor.

SUMMARY OF THE INVENTION

The present invention provides, in one aspect, a power tool including a housing having a motor housing portion and a handle portion extending therefrom, an electric motor positioned within the motor housing portion, a trigger switch configured to activate and deactivate the motor, and a non-contact mode selector switch separate from the trigger switch. The non-contact mode selector switch is configured to adjust an operational mode of the tool and is positioned in a foot of the handle portion opposite the motor housing portion.

The present invention provides, in another aspect, a power tool including a housing having a motor housing portion and a handle portion extending therefrom. The handle portion includes a foot extending therefrom opposite the motor housing portion. The power tool also includes a battery receptacle defined in a bottom surface of the foot in which a battery pack is receivable, an electric motor positioned within the motor housing portion, a trigger switch configured to activate and deactivate the motor, and a mode selector switch positioned in the foot of the handle portion. The mode selector switch is configured to adjust an operational mode of the power tool.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
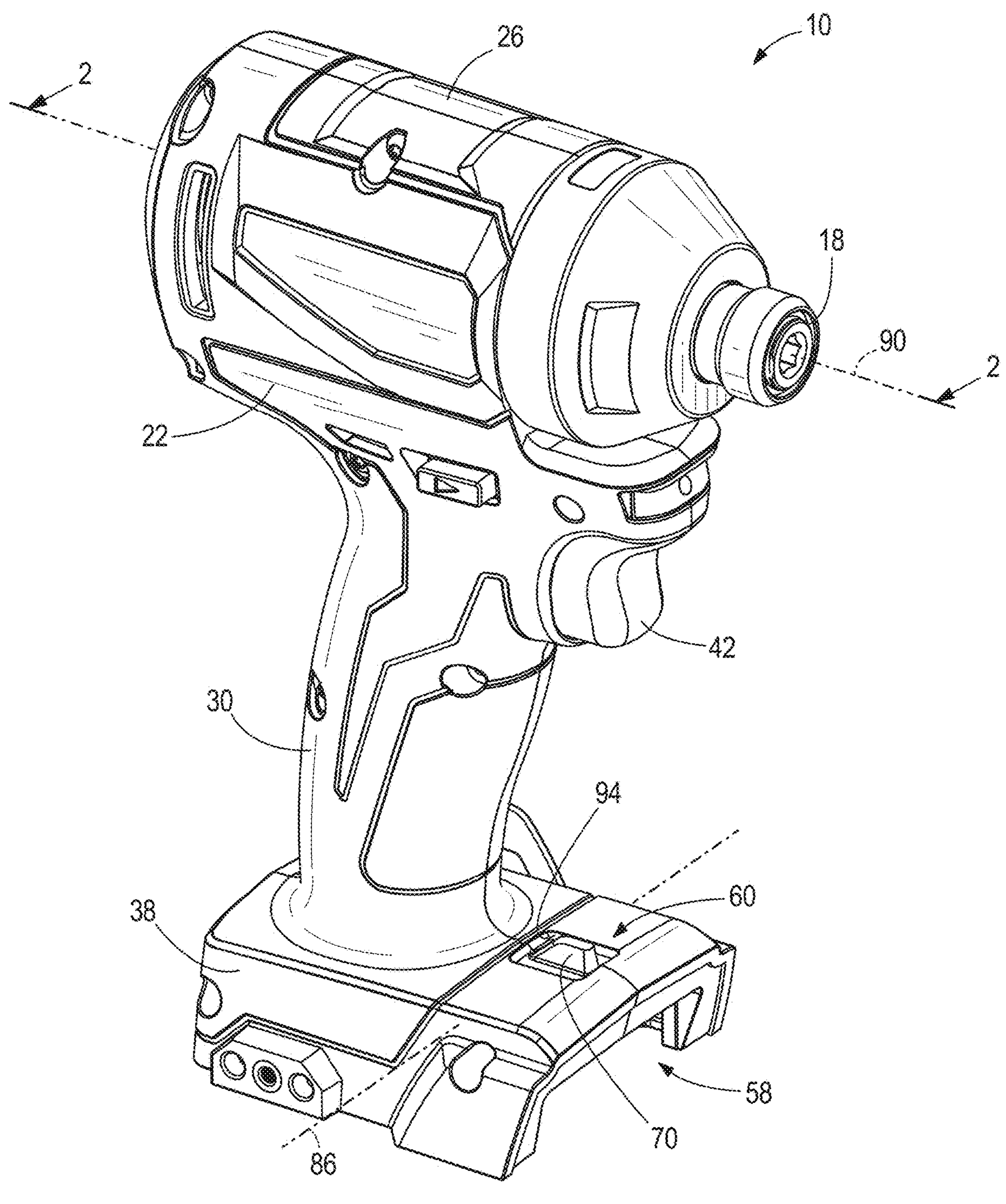
FIG. 1 is perspective view of a rotary power tool in accordance with an embodiment of the invention.
Figure 2:
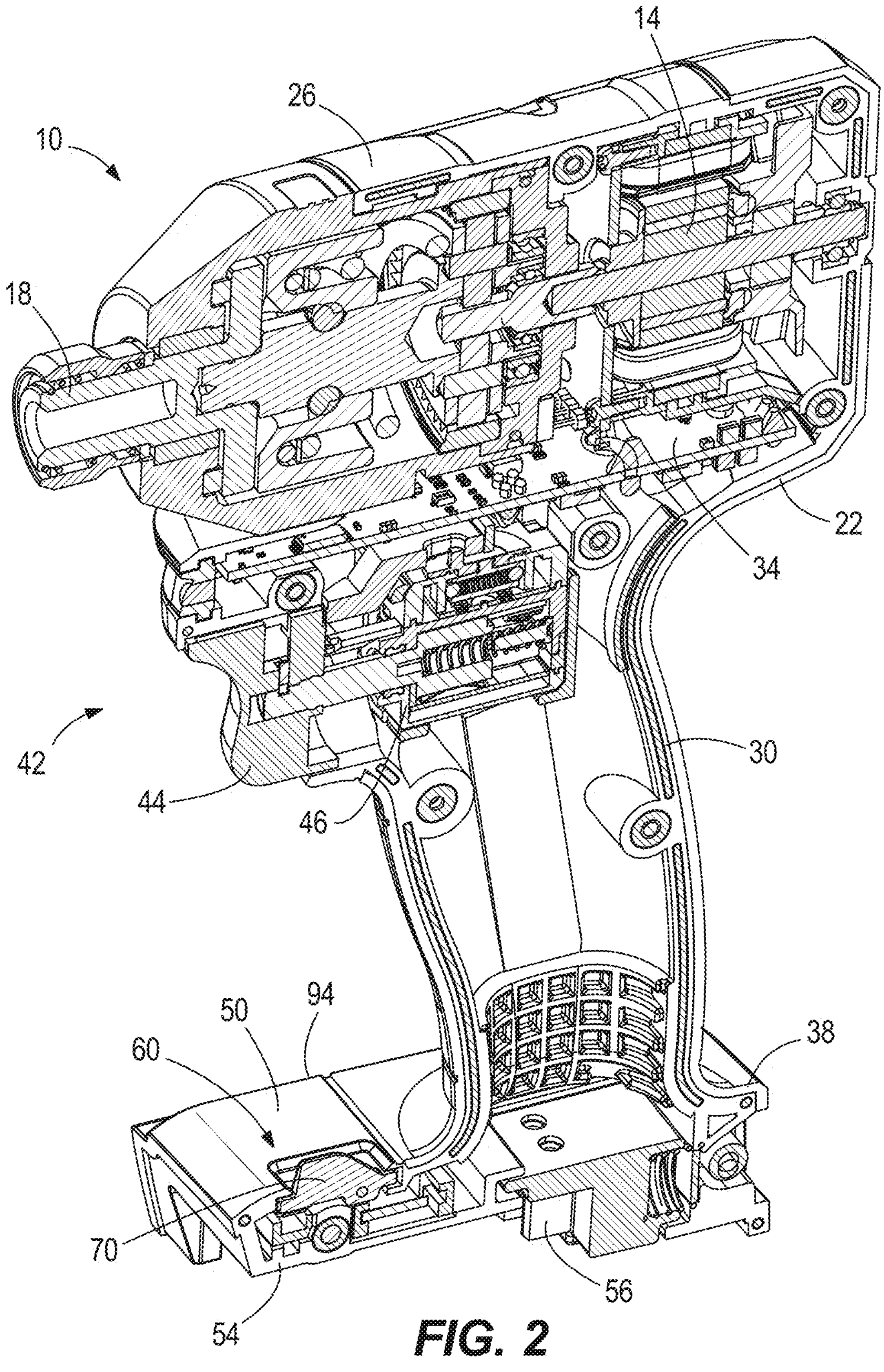
FIG. 2 is a cross-sectional view of the rotary power tool of FIG. 1 taken along line 2-2 shown in FIG. 1.

With reference to FIGS. 1 and 2, a rotary power tool 10 includes a brushless DC electric motor 14 and an output shaft 18 that receives torque from the electric motor 14, causing the output shaft 18 to rotate. The illustrated rotary power tool 10 is configured as an impact driver operable to deliver discrete rotational impacts upon fasteners (e.g., screws) for tightening or loosening the fasteners.

The power tool 10 includes a housing 22 having a motor housing portion 26 in which the motor 14 is supported (FIG. 2) and a handle portion 30 extending from the motor housing portion 26 that is graspable by the user of the tool 10 during use. The power tool 10 also includes a controller 34 (e.g., a printed circuit board having one or more microprocessors and multiple field-effect transducers) for driving the motor 14 positioned within the motor housing portion 26 beneath the motor 14. The handle portion 30 also includes a foot 38 contiguous with an end of the handle portion 30 that is opposite the motor housing portion 34. The power tool 10 further includes a trigger switch 42 having an actuator portion 44 and an electromechanical switch portion 46. The actuator portion 44 is adjacent the handle portion 30 so that it may be grasped and pulled by the operator while holding the handle portion 30. The electromechanical switch portion 46 provides an input signal to the controller 34 to activate and deactivate the motor 14 in response to the operator depressing the actuator portion 44.

The foot 38 includes a top surface 50 and an opposite, bottom surface 54. The foot 38 is configured to detachably receive a battery pack (not shown) within a battery receptacle 58 (FIG. 1) defined in the bottom surface 54. The power tool 10 includes electrical conductors 56 in the foot 38 that mechanically and electrically connect the battery pack to the controller 34.

Figure 3:
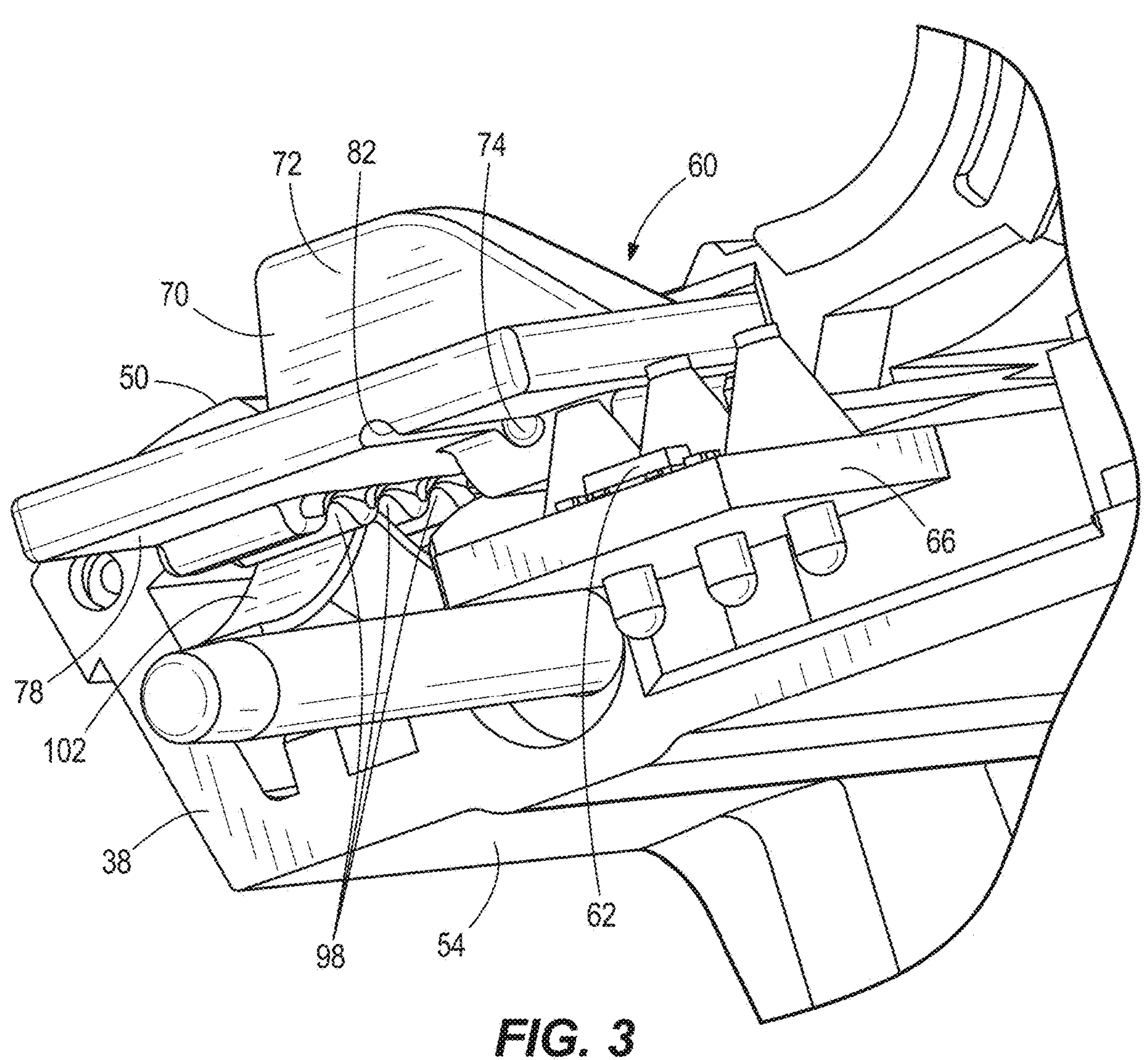
FIG. 3 is a perspective, partial cutaway view of a non-contact speed switch of the rotary power tool of FIG. 1.

With reference to FIGS. 1-3, the power tool 10 further includes a non-contact speed selector switch 60 on the top surface 50 of the foot 38. The switch 60 includes a proximity sensor, such as a Hall-effect sensor 62, on a printed circuit board 66 within the foot 38 and an actuator 70 in facing relationship with the circuit board 66 (FIG. 3). The actuator 70 includes a shuttle body 72 and a magnet 74 positioned on a lower surface 78 of the shuttle body 72. Specifically, the magnet 74 has a cylindrical shape and is received within a cylindrical bore 82 in the shuttle body 72 extending in a lateral direction of the tool 10 along an axis 86, which is transverse to a longitudinal axis 90 of the tool 10 that is coaxial with the motor 14 and the output shaft 18 (FIG. 1). In the illustrated embodiment, the magnet 74 is held within the cylindrical bore 82 using an interference fit. However, other means for retaining the magnet 74 within the bore 82 (e.g., adhesives, resilient fingers, etc.) may be used in addition to or in place of the interference fit.

With reference to FIGS. 1 and 2, the foot 38 defines an aperture 94 in the top surface 50 thereof through which a portion of the shuttle body 72 protrudes to be grasped by an operator of the tool 10. The aperture 94 has a rectangular shape and restricts movement of the shuttle body 72 to translation along axis 86, resulting in lateral sliding movement of the shuttle body 72 relative to the axis 86. With reference to FIG. 3, with lateral sliding movement of the shuttle body 72, the relative proximity of the magnet 74 to the Hall-effect sensor 62 is varied, which causes the Hall-effect sensor 62 to output a signal to the controller 34 that is proportional to the proximity of the magnet 74. This signal is used by the controller 34 as an input to determine the rotational speed at which to operate the motor 14. As such, the non-contact speed selector switch 60 does not rely upon a movable conductor capable of electrical contact with one or more circuits in the controller 34, and is thus considered a "non-contact" switch.

With reference to FIG. 3, the shuttle body 72 includes three detent recesses 98 that are selectively engageable by a detent spring 102 positioned beneath the shuttle body 72 in the foot 38. The detent spring 102 is operable to hold the shuttle body 72 in one of three different positions along the axis 86 that coincide with three different positions of the magnet 74 relative to the Hall-effect sensor 62. The detent spring 102 is resilient and is capable of being deflected out of one of the recesses and into another in response to a sufficiently high force applied to the shuttle body 72 in the direction of axis 86 to slide the shuttle body 72 laterally (i.e., to the left or right) relative to the foot 38. The Hall-effect sensor 62 is operable to detect the proximity of the magnet 74 in all three positions and output a variable voltage signal to the controller 34, which interpolates the signal to determine the position of the shuttle body 72, based on the magnitude of the voltage signal. The controller 34 then drives the motor 14, in response to an operator depressing the trigger switch 42, at one of three speeds depending upon the position of the shuttle body 72.

For example, in the case of the trigger switch 42 being configured as a variable voltage trigger switch 42, the motor 14 is operable between 0 revolutions per minute and N1 revolutions per minute when the shuttle body 72 is in a first position. When the shuttle body 72 is in a second position, the motor is operable between 0 revolutions per minute and N2 revolutions per minute. And, when the shuttle body 72 is in a third position, the motor is operable between 0 revolutions per minute and N3 revolutions per minute, where $N1<N2<N3$. Alternatively, for a trigger switch 42 only capable of being switched between an open state and a closed state, depressing the trigger switch 42 with the shuttle body 72 in the first position will operate the motor 14 at the first speed N1. Likewise, depressing the trigger switch 42 with the shuttle body 72 in the second position will operate the motor 14 at the second speed N2, and depressing the trigger switch 42 with the shuttle body 72 in the third position will operate the motor 14 at the third speed N3.

FIGS. 4-7 illustrate a rotary power tool 210, such as hammer-drill driver, according to another embodiment of the invention. The power tool 210 includes a housing 222, a motor 214 disposed within the housing 222, and a multi-stage planetary transmission 304 coupled to the motor 214. An output of the transmission 304 (FIG. 5) is coupled to an output shaft 218 for supplying torque from the motor 214 to the output shaft 218. The power tool 210 further includes an electronic clutch (implemented on a printed circuit board 266) used in conjunction with the transmission 304 to selectively limit the amount of torque that may be transferred from the motor 214 to the transmission 304.

Figure 4:
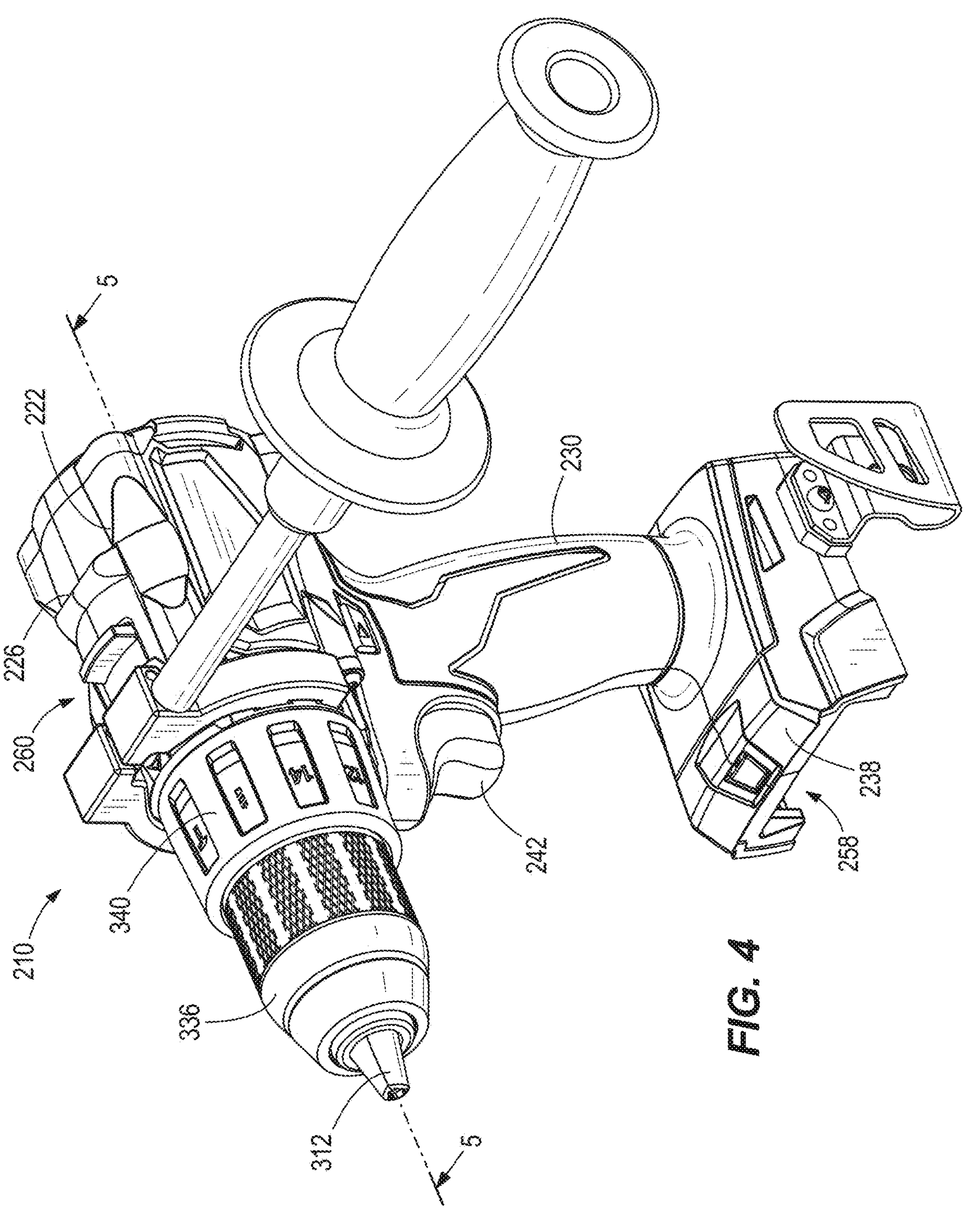
FIG. 4 is a perspective view of a rotary power tool in accordance with another embodiment of the invention.
Figure 5:
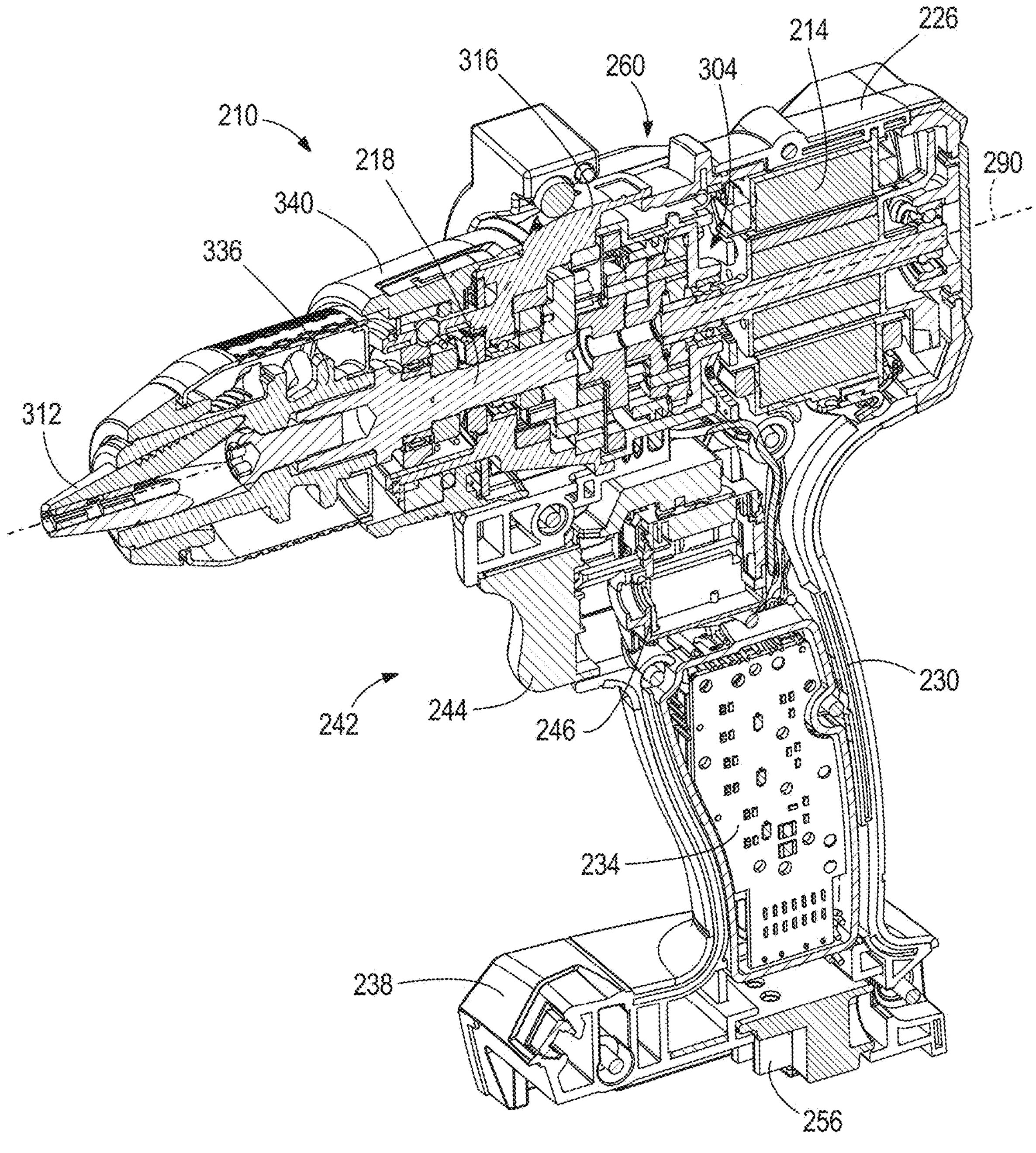
FIG. 5 is a cross-sectional view of the rotary power tool of FIG. 4 taken along line 5-5 shown in FIG. 4.

With reference to FIGS. 4 and 5, the housing 222 includes a motor housing portion 226 in which the motor 214 is supported and a handle portion 230 extending from the motor housing portion 226 that is graspable by the user of the tool during use. The handle portion 230 includes a foot 238 contiguous with an end of the handle portion 230 that is opposite the motor housing portion 226.

The power tool 210 also includes a controller 234 (e.g., a printed circuit board having one or more microprocessors and multiple field-effect transducers) for driving the motor 214. In the illustrated embodiment, the controller 234 is positioned within the handle portion 230. The power tool 210 further includes a trigger switch 242 having an actuator portion 244 and an electromechanical switch portion 246. The actuator portion 244 is adjacent the handle portion 230 so that it may be grasped and pulled by the operator while holding the handle portion 230. The electromechanical switch portion 246 provides an input signal to the controller 234 to activate and deactivate the motor 214 in response to the operator depressing the actuator portion 244.

With reference to FIG. 5, the motor 214 is configured as a brushless DC electric motor 214 that receives power from an on-board power source (e.g., a battery, not shown). In the illustrated embodiment, the battery is a battery pack removably coupled to a battery receptacle 258 of the foot 238. Alternatively, the motor 214 may be powered by a remote power source (e.g., a household electrical outlet) through a power cord. In addition, the motor 214 defines a longitudinal axis 290, which in the illustrated embodiment is coaxial with the output shaft 218 and a tool chuck or bit retainer 312. The power tool 10 includes electrical conductors 256 in the foot 238 that mechanically and electrically connect the battery pack to the controller 234.

Figure 6:
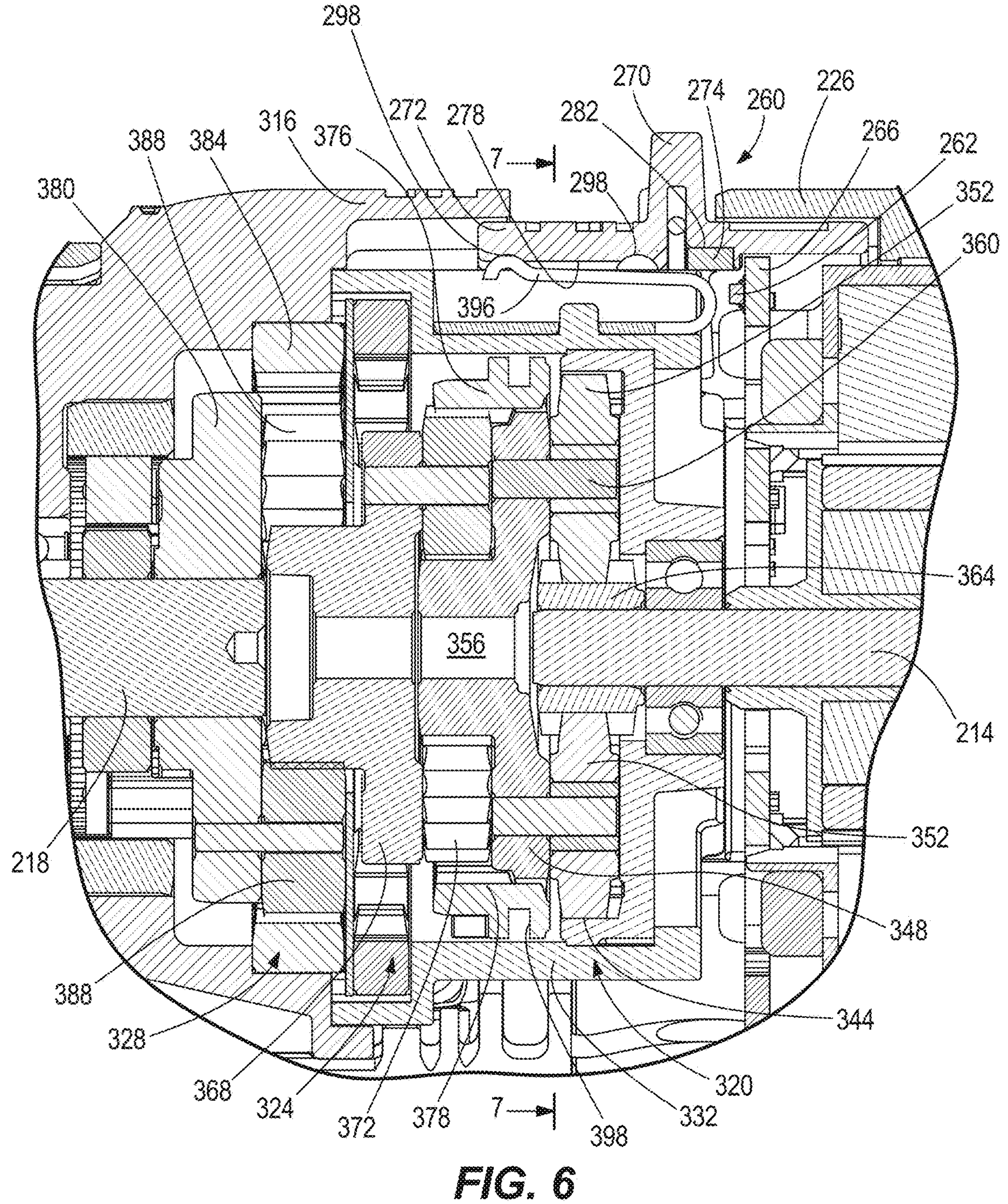
FIG. 6 is a partial cross-sectional view of the power tool of FIG. 5.

With reference to FIG. 6, the multi-stage transmission 304 includes a transmission housing 316 and three planetary stages 320, 324, 328, the last of which is coupled to the output shaft 218. In the illustrated construction of the transmission 304, the transmission housing 316 includes a gear case 332 containing therein the three planetary stages 320, 324, 328. The transmission housing 316 further contains the output shaft 218 extending from an output of the transmission 304. Alternatively, the transmission housing 316 may be divided into any number of portions. The transmission housing 316 is positioned between the motor housing portion 226 and a tool chuck body 336 of the bit retainer 312 (FIG. 5).

With reference to FIG. 6, the first planetary stage 320 includes a first stage ring gear 344, a first stage carrier 348, and a plurality of first stage planet gears 352. The first stage carrier 348 includes a sun gear 356, which is a component of the second planetary stage 324, extending from the front of the carrier 348. A plurality of axles 360 also extend from the rear of the carrier 104 upon which the first stage planet gears 108 are rotatably supported. The first stage carrier 348 also includes a plurality of projections (not shown) that extend radially outwardly from an outer circumferential surface of the carrier 348, the purpose of which is described below. The first stage planet gears 352 are engaged to an input pinion 364 which, in turn, is coupled to an output of the motor 214 for transferring torque to the three planetary stages 320, 324, 328.

With continued reference to FIG. 6, the second planetary stage 324 includes a second stage carrier 368, a plurality of second stage planet gears 372, and a second stage ring gear 376. The second planetary stage 324 is positioned downstream of the first planetary stage 320 to receive torque from the first planetary stage 320. Likewise, the third planetary stage 328 is positioned downstream of the second planetary stage 324 to receive torque from the second planetary stage 324.

The ring gear 376 is annular and has a plurality of teeth 378 (FIG. 6) on an inner circumferential surface of the ring gear 376 that are meshed with teeth of the plurality of second stage planet gears 372 and are selectively meshed with corresponding teeth on the outer periphery of the first stage carrier 348. The ring gear 376 is axially movable relative to the longitudinal axis 290 for selectively enabling the second planetary stage 324.

The third planetary stage 328 includes a disk 380, a third stage ring gear 384, and a plurality of third stage planet gears 388. The planet gears 388 include a plurality of axels (not shown) for coupling the disk 380 and the planet gears 388 for co-rotation. The disk 380 is directly coupled to the output shaft 218. The disk 380 may be coupled to the output shaft 218 in any of a number of different ways (e.g., by using a key and keyway arrangement, an interference fit, a spline-fit, etc.)

With reference to FIGS. 4-6, the power tool 210 further includes a non-contact speed selector switch 260 on the motor housing portion 226. The switch 260 includes a proximity sensor, such as a Hall-effect sensor 262, on the printed circuit board 266 within the motor housing portion 226, and an actuator 270. The printed circuit board 266 is in electrical communication with the controller 243 and is positioned between the motor 214 and the transmission 304. Furthermore, the actuator 270 is substantially perpendicular to the circuit board 66 (FIG. 6). The actuator 270 includes a shuttle body 272 and a magnet 274 positioned on a lower surface 278 of the shuttle body 272. Specifically, the magnet 274 has a rectangular shape and is received within a rectangular bore 282 in the shuttle body 272 extending in a longitudinal direction of the tool 210 along the axis 290. In the illustrated embodiment, the magnet 274 is held within the bore 282 using an interference fit. However, other means for retaining the magnet 274 within the bore 282 (e.g., adhesives, resilient fingers, etc.) may be used in addition to or in place of the interference fit.

With reference to FIGS. 4-6, the motor housing portion 226 defines an aperture 294 in a top surface 250 thereof through which a portion of the shuttle body 272 protrudes to be grasped by an operator of the tool 210. The aperture 294 has a rectangular shape and restricts movement of the shuttle body 272 to translation along axis 290, resulting in longitudinal sliding movement of the shuttle body 272 relative to the axis 290. With reference to FIG. 6, with longitudinal sliding movement of the shuttle body 272, the relative proximity of the magnet 274 to the Hall-effect sensor 262 is varied, which causes the Hall-effect sensor 262 to output a signal to the controller 234 that is proportional to the proximity of the magnet 274. This signal is used by the controller 234 as an input to determine the rotational speed (i.e., low or high speed) at which the motor 214 is operating. As such, the non-contact speed selector switch 260 does not rely upon a movable conductor capable of electrical contact with one or more circuits in the controller 234, and is thus considered a "non-contact" switch.

Figure 7:
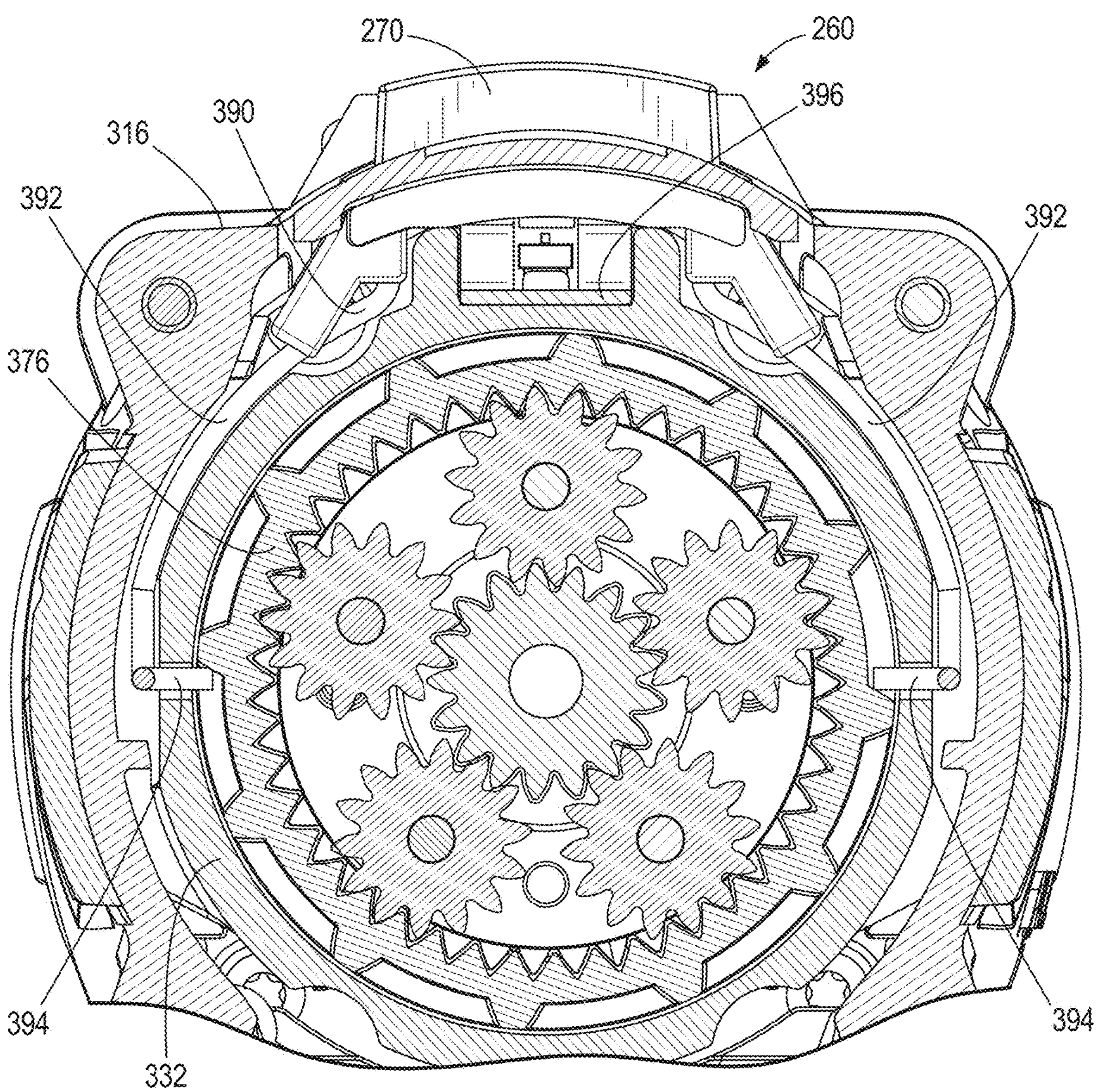
FIG. 7 is a partial cross-sectional view of the power tool of FIG. 4, viewed along section 7-7 in FIG. 6.

With reference to FIGS. 5-7, the non-contact speed selector switch 260 includes a mechanical switch portion for adjusting the ring gear 376 of the transmission 304 between a first position, in which the second stage planet gears 372 are rotatable relative to the first stage carrier 348 for enabling the second planetary stage 324, and a second position, in which the first stage carrier 348 is coupled for co-rotation with the second stage planet gears 372 for disabling the second planetary stage 324. More specifically, the non-contact speed selector switch 260 is operable to adjust a speed setting and/or mechanical gear ratio of the multi-stage transmission 304 for adjusting a torque of the power tool 210.

As shown in FIG. 7, in the illustrated construction of the transmission 304, the mechanical switch portion of the non-contact speed selector switch 260 includes the actuator 270 coupled to the ring gear 376 via an attachment member 390 for shifting the ring gear 376 between the first and second positions. The actuator 270 is positioned above the transmission 304 in the transmission housing 316. The illustrated attachment member 390 is attached to a center of the actuator 270 and includes two sections 392 extending from the actuator 270 on either side of the ring gear 376. Furthermore, each section 392 has a finger 394 positioned in a groove 398 (FIG. 6) defined by an outer circumferential surface of the ring gear 376.

With reference to FIG. 6, the shuttle body 272 further includes two detent recesses 298 that are selectively engageable by a detent spring 396 positioned between the shuttle body 272 of the actuator 270 and the gear case 332 of the transmission 304. The detent spring 396 is operable to hold the shuttle body 272 in one of the two different positions along the longitudinal axis 290 that coincide with two different positions of the magnet 274 relative to the Hall-effect sensor 262 (i.e., corresponding to high and low speed). The detent spring 396 is resilient and is capable of being deflected out of one of the recesses 298 and into another in response to a sufficiently high force applied to the shuttle body 272 in the direction of the longitudinal axis 290 to slide the shuttle body 272 longitudinally (i.e., forward or backward) relative to the transmission housing 316. The Hall-effect sensor 262 is operable to detect the proximity of the magnet 274 in both positions and output the variable voltage signal to the controller 234, which interpolates the signal to determine the position of the shuttle body 272, based on the magnitude of the voltage signal. The controller 234 then drives the motor 214, in response to an operator depressing the trigger switch 242, at either the low or high speed depending upon the position of the shuttle body 272. Alternatively, the mechanical switch portion of the non-contact speed selector switch 260 may be configured in any of a number of different ways for displacing the ring gear 376 between the first and second positions.

Operation of the multi-speed planetary transmission 304 will now be discussed with respect to FIGS. 5 and 6.

The multi-stage planetary transmission 304 is configured in a low-speed, high torque mode when the actuator 270 and the ring gear 376 are shifted to the first position (i.e., to the left), thereby engaging the respective teeth 378 on the ring gear 376 and the second stage planetary gears 372 to allow rotation of the planetary gears 372 separate from the first stage carrier 348 to enable the second planetary stage 324.

The multi-stage planetary transmission 304 is configured in a high-speed, low torque mode (shown in FIG. 6) when the actuator 270 and the ring gear 376 are shifted to the second position (i.e., to the right), thereby engaging the teeth 378 of the ring gear 376 with the respective teeth of the first stage carrier 348 and the second stage planetary gears 372 such that the first stage carrier 348 and the second stage planetary gears 372 rotate as a unit. In this position, the first stage carrier 348 co-rotates with the second stage planetary gears 372 for disabling the second planetary stage 324.

With reference to FIG. 4, the power tool 210 may further include a mode selection collar 340 rotatable by a user to switch between different modes (e.g., "drill" only, "hammer-drill", etc.) of the power tool 210. In the illustrated embodiment, the collar 340 is positioned on the transmission housing 316 and adjacent the tool chuck body 336. A user selects the mode by rotating the collar 340. The controller 234 is also operable to determine a clutch setting for each mode in which the controller 234 is configured to set a current draw limit from the battery for each clutch setting to limit the torque output of the tool in accordance with the respective clutch settings. Specifically, the controller 234 monitors a current output from the battery to the motor 214 to determine when the current draw limit is reached. The controller 234 is further configured to stop (i.e., cut-off) the current output from the battery to the motor 214, thereby stopping the operation of the power tool 210, when the current draw limit is reached.

With continued reference to FIG. 6, the electronic clutch (implemented by the controller 234 and/or the printed circuit board 266) is used in conjunction with the non-contact speed selector switch 260. The Hall-effect sensor 262 is operable to detect the proximity of the magnet 274 in the two positions of the actuator 270 and output a variable voltage signal to the controller 234. The controller 234 interpolates the signal to determine the position of the shuttle body 272, based on the magnitude of the voltage signal. As such, the controller 234 is configured to determine whether the transmission 304 is in the low speed, high torque mode or the high speed, low torque mode based on the voltage signal output by the Hall-effect sensor 262 in the two positions of the actuator 270.

The controller 234 is further configured to adjust the current draw limit based on the mode of the transmission 304 (i.e., the operating speed of the power tool 210). As such, the current draw limit is suitably adjusted based on the mode of the power tool 210 (i.e., "drill" only, "hammer-drill") and the speed of the power tool 210. The electronic clutch may then stop the operation of the power tool 210 when the controller 234 detects that the current draw has been reached.

For example, when the trigger switch 242 is depressed with the shuttle body 272 is in the first position, the controller 234 will determine the speed of the power tool 210 to be in a first speed N1 and subsequently adjust the current draw limit. Likewise, when the trigger switch 242 is depressed with the shuttle body 272 is in the second position, the controller 234 will determine the speed of the power tool 210 to be in a second speed N2 and subsequently adjust the current draw limit.

In operation, a user selects the clutch setting of the power tool 210 and the mode of the transmission 304 (i.e., low speed, high torque or high speed, low torque) by actuating the actuator 270 into the first position or the second position. The controller 234 determines the mode of the transmission 304 based on the position of the shuttle body 272 and adjusts the current draw limit. The user then depresses the trigger switch 242 to activate the motor 214. The user may operate the power tool 210 until the electronic clutch stops the power tool when the current draw limit is reached.

Figure 8:
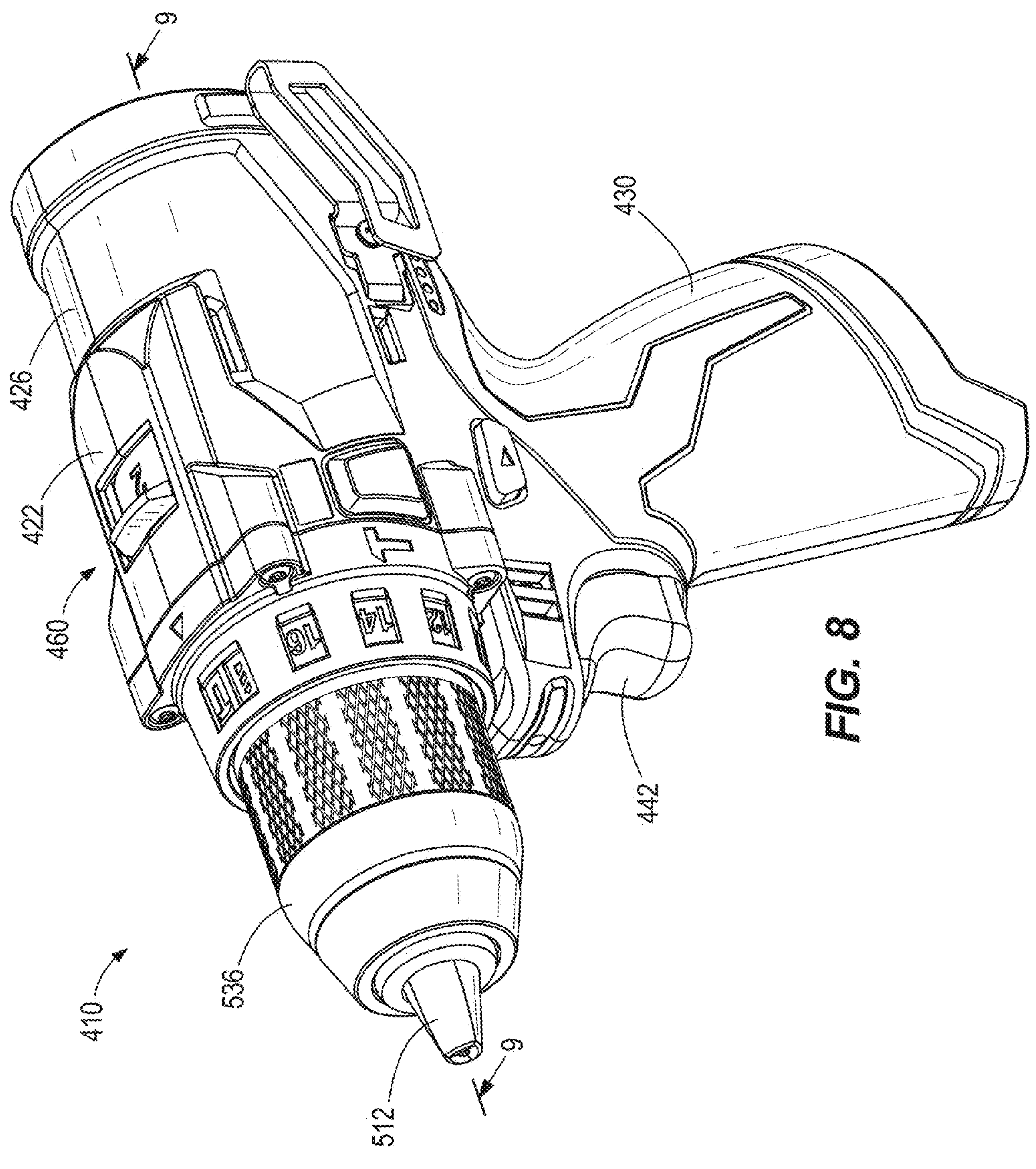
FIG. 8 is a perspective view of a rotary power tool in accordance with yet another embodiment of the invention.
Figure 9:
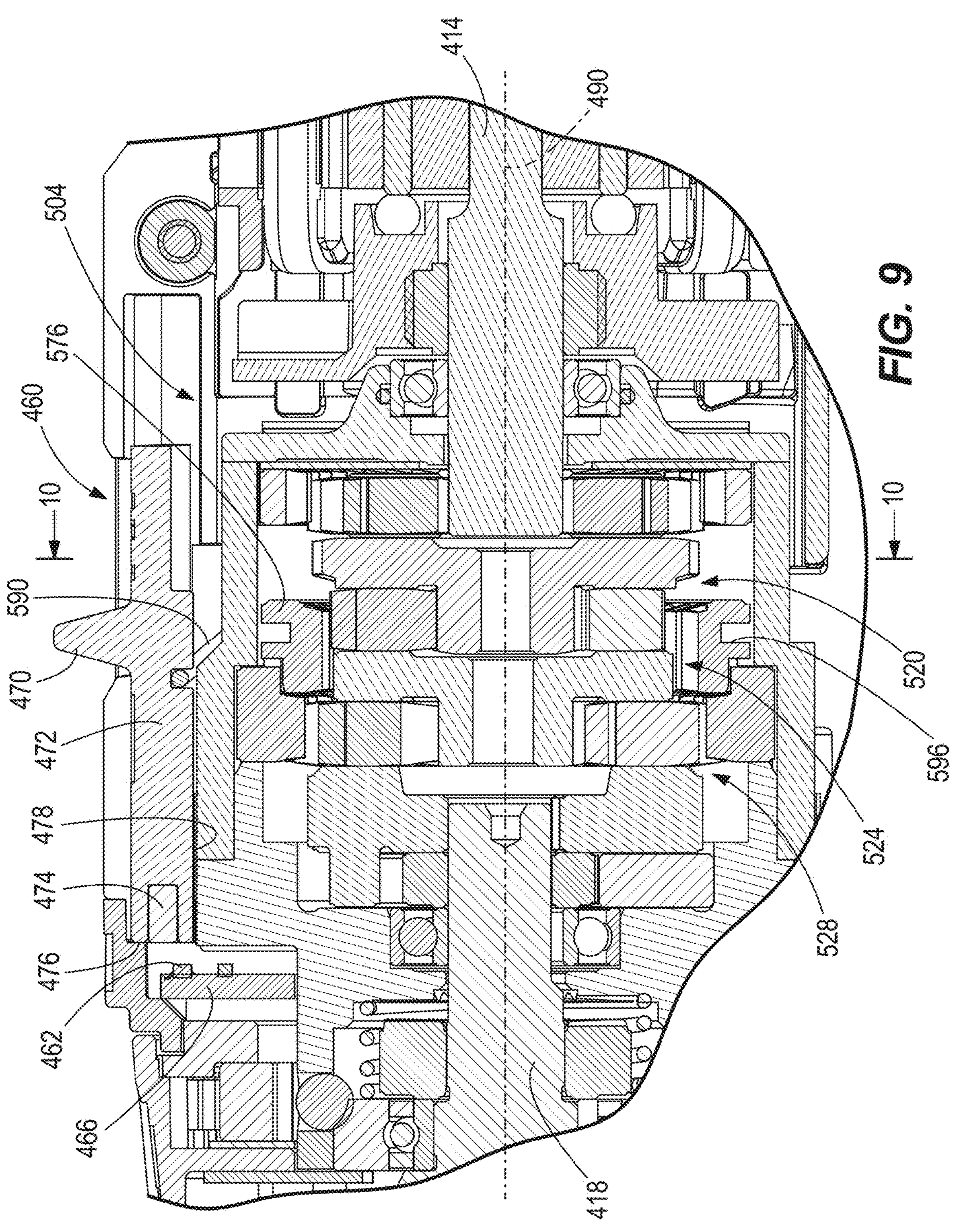
FIG. 9 is a partial cross-sectional view of the rotary power tool of FIG. 8 taken along line 9-9 shown in FIG. 8.
Figure 10:
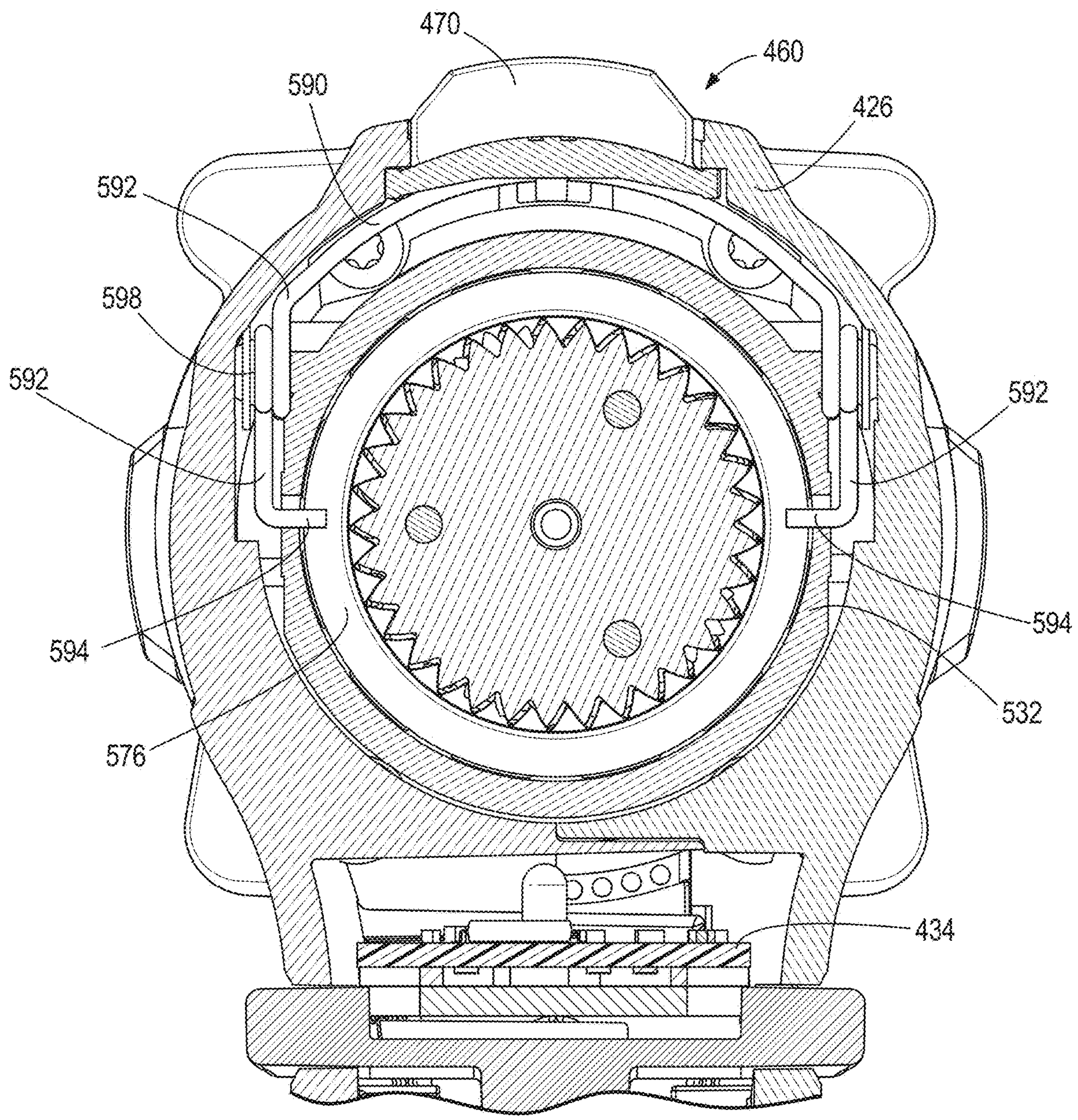
FIG. 10 is a partial cross-sectional view of the power tool of FIG. 8, viewed along section 10-10 in FIG. 9.

FIGS. 8-10 illustrate a rotary power tool 410, such a hammer-drill driver, according to a third embodiment of the invention. The power tool 410 includes similar features as the power tool 210 of the second embodiment, including a motor 414, a transmission 504, a non-contact speed selector switch 460, an electronic clutch, and a bit retainer 512 (FIG. 8). A housing 422 of the power tool 410 includes a handle portion 430 in which the battery may be positioned within the handle portion 430 for selectively supplying power to the motor 414. Furthermore, a controller 434 (FIG. 10) is positioned within a motor housing portion 426 below the motor 414, similar to the controller 34 of the first embodiment.

With reference to FIG. 9, the transmission 504 includes three planetary stages 520, 524, 528. The first planetary stage 520 is coupled to an output of the motor 414 for transferring torque to the three planetary stages 520, 524, 528. The third planetary stage 528 is coupled to the output shaft 418 for transferring torque from the motor 414 to the output shaft 418. The output shaft 418 is coupled to the bit retainer 512 for transferring toque to operate the power tool 410. The transmission 504 further includes a movable ring gear 576 relative to longitudinal axis 490 for enabling/disabling the second planetary stage 524 to change a mode of the transmission 504 (i.e., low speed, high torque and high speed, low torque) similar to the second embodiment.

As shown in FIG. 10, in the illustrated second construction of the transmission 504, a mechanical switch portion of the non-contact speed selector switch 460 includes an actuator 470 coupled to the ring gear 576 via the attachment member 590 for shifting the ring gear 576 between first and second positions. The actuator 470 is positioned above the transmission 504 in the motor housing portion 426. The illustrated attachment member 590 is attached to a center of the actuator 470 and includes two sections 592 extending from the actuator 470 on either side of the ring gear 576. Furthermore, each section 592 is attached to an extending portion 598 of a gear case 532, facilitating pivoting movement of the member 590 in response to translation of the actuator 470, and terminates in a finger 594 that is received within a groove 596 (FIG. 9) defined by an outer circumferential surface of the ring gear 576.

With reference to FIG. 9, the non-contact speed selector switch 460 is positioned in the motor housing portion 426 and includes a magnet 474 in facing relationship with a Hall-effect sensor 462 on a printed circuit board 466. Specifically, the magnet 474 is positioned within a corresponding recess in an end 476 of a shuttle body 472. The printed circuit board 466 is positioned between the transmission 504 and a tool chuck 536 of the bit retainer 512 (FIG. 8). Furthermore, the Hall-effect sensor 462 senses the proximity of the magnet 474 when the actuator 470 is moved between the first and second positions in the same manner as described above.

With continued reference to FIG. 9, the electronic clutch (implemented by the controller 434 and/or the printed circuit board 466) is used in conjunction with the non-contact speed selector switch 460. The Hall-effect sensor 462 is operable to detect the proximity of the magnet 474 in the two positions of the actuator 470 and output a variable voltage signal to the controller 434. The controller 434 interpolates the signal to determine the position of the shuttle body 472, based on the magnitude of the voltage signal. The controller 434 is further configured to adjust a current draw limit based on the mode of the transmission 504 (i.e., the operating speed of the power tool 410). As such, the current draw limit is suitably adjusted based on the speed of the power tool 410 and the particular clutch setting of the power tool 410. The electronic clutch may then stop the operation of the power tool 410 when the controller 434 detects that the current draw has been reached.

Various features of the invention are set forth in the following claims.

What is claimed is:

1. A power tool comprising:

a housing including a motor housing portion and a handle portion extending therefrom, the handle portion including a foot extending therefrom opposite the motor housing portion, the motor housing portion defining a longitudinal axis;

a battery receptacle defined in a bottom surface of the foot in which a battery pack is receivable;

an electric motor positioned within the motor housing portion;

a trigger switch configured to activate and deactivate the motor; and a mode selector switch positioned in the foot of the handle portion, the mode selector switch including an actuator configured to adjust an operational mode of the power tool;

wherein the foot defines an aperture in a top surface through which a portion of the actuator protrudes, and wherein the aperture restricts movement of the actuator to translation along an axis transverse to the longitudinal axis.

2. The power tool of claim 1, wherein the mode selector switch includes a stationary sensor, and wherein the actuator is not in physical contact with the sensor.

3. The power tool of claim 2, wherein the mode selector switch includes a circuit board configured to support the sensor.

4. The power tool of claim 3, wherein the sensor is a Hall-effect sensor, wherein the actuator includes a magnet, and wherein the mode selector switch is configured to adjust the operational mode of the power tool based on a position of the magnet relative to the Hall-effect sensor.

5. The power tool of claim 4, wherein the magnet is disposed on a lower surface of the actuator that is oriented parallel to a surface of the circuit board on which the Hall-effect sensor is disposed.

6. The power tool of claim 1, wherein the mode selector switch includes a circuit board disposed within the foot of the handle portion, wherein the mode selector switch includes a plurality of recesses disposed on an underside of a movable portion of the mode selector switch such that the plurality of recesses are positioned within the foot, and wherein the mode selector switch includes a detent spring positioned beneath the movable portion of the mode selector switch and disposed adjacent the circuit board.

7. The power tool of claim 1, wherein the longitudinal axis of the motor housing portion defines a forward direction and rearward direction of the power tool, with the forward direction being adjacent an output shaft of the power tool, wherein at least a portion of the foot extends forward of the handle, and wherein the mode selector switch is positioned in the foot forward of the handle.

8. The power tool of claim 1, wherein the operational mode that is adjustable by the mode selector switch is a rotational speed of the motor.

9. The power tool of claim 8, wherein the operational mode includes a first operational mode coinciding with a first rotational speed of the electric motor, and a second operational mode coinciding with a different, second rotational speed of the electric motor.

* * * * *